US010600421B2

(12) United States Patent
Yang et al.

(10) Patent No.: US 10,600,421 B2
(45) Date of Patent: Mar. 24, 2020

(54) MOBILE TERMINAL AND CONTROL METHOD THEREOF

(71) Applicant: Samsung Electronics Co., Ltd., Suwon-si, Gyeonggi-do (KR)

(72) Inventors: Do-Jun Yang, Yongin-si (KR); Dong-Seok Kim, Suwon-si (KR); Se-Hyun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 14/716,360

(22) Filed: May 19, 2015

(65) Prior Publication Data

US 2015/0340041 A1 Nov. 26, 2015

(30) Foreign Application Priority Data

May 23, 2014 (KR) .................. 10-2014-0062018

(51) Int. Cl.
G10L 17/22 (2013.01)
H04W 4/029 (2018.01)
H04W 4/16 (2009.01)
H04W 12/06 (2009.01)

(52) U.S. Cl.
CPC ............ G10L 17/22 (2013.01); H04W 4/029 (2018.02); H04W 4/16 (2013.01); H04W 12/06 (2013.01)

(58) Field of Classification Search
CPC ..................... G06F 21/32; G06F 17/30764
See application file for complete search history.

(56) References Cited

U.S. PATENT DOCUMENTS

| 4,969,180 | A | 11/1990 | Watterson et al. |
| 5,422,816 | A | 6/1995 | Sprague et al. |
| 5,537,459 | A | 7/1996 | Price et al. |
| 5,912,644 | A | 6/1999 | Wang |
| 5,970,457 | A | 10/1999 | Brant et al. |
| 5,983,100 | A | 11/1999 | Johansson et al. |
| 6,021,371 | A | 2/2000 | Fultz |
| 6,026,162 | A | 2/2000 | Palett et al. |
| 6,091,956 | A | 7/2000 | Hollenberg |
| 6,097,943 | A | 8/2000 | Nordwall |
| 6,108,592 | A | 8/2000 | Kurtzberg et al. |
| 6,128,482 | A | 10/2000 | Nixon et al. |
| 6,169,955 | B1 | 1/2001 | Fultz |
| 6,304,844 | B1 | 10/2001 | Pan et al. |
| 6,320,943 | B1 | 11/2001 | Borland |

(Continued)

FOREIGN PATENT DOCUMENTS

JP 2006-204401 A 8/2006

Primary Examiner — Neeraj Sharma
(74) Attorney, Agent, or Firm — Jefferson IP Law, LLP

(57) ABSTRACT

A mobile terminal is provided. The mobile terminal includes a voice receiving module configured to receive the voice of a user through a first application and to generate first voice data for the voice received through the first application, a control module configured to transmit the first voice data and user information corresponding to the first voice data to a service server and to request the service server to register the first voice data and the user information, and a communication module configured to transmit, to the service server, a request for the user information corresponding to the voice of the user received through a second application when the voice of the user is received through the second application.

16 Claims, 11 Drawing Sheets

(56) References Cited

U.S. PATENT DOCUMENTS

| | | |
|---|---|---|
| 6,374,078 B1 | 4/2002 | Williams et al. |
| 6,374,126 B1 | 4/2002 | MacDonald, Jr. et al. |
| 6,424,945 B1 | 7/2002 | Sorsa |
| 6,467,089 B1 | 10/2002 | Aust et al. |
| 6,542,758 B1 | 4/2003 | Chennakeshu et al. |
| 6,600,734 B1 | 7/2003 | Gernert et al. |
| 6,604,086 B1 | 8/2003 | Kolls |
| 6,650,997 B2 | 11/2003 | Funk |
| 6,662,163 B1 | 12/2003 | Albayrak et al. |
| 6,675,027 B1 | 1/2004 | Huang |
| 6,678,612 B1 | 1/2004 | Khawam |
| 6,704,039 B2 | 3/2004 | Pena |
| 6,718,187 B1 | 4/2004 | Takagi et al. |
| 6,728,375 B1 | 4/2004 | Palett et al. |
| 6,741,931 B1 | 5/2004 | Kohut et al. |
| 6,757,362 B1* | 6/2004 | Cooper ............... H04M 3/527 |
| | | 379/88.01 |
| 6,763,226 B1 | 7/2004 | McZeal, Jr. |
| 6,791,974 B1 | 9/2004 | Greenberg |
| 6,792,263 B1 | 9/2004 | Kite |
| 6,813,601 B1 | 11/2004 | Hedinger |
| 6,842,617 B2 | 1/2005 | Williams et al. |
| 6,862,713 B1 | 3/2005 | Kraft et al. |
| 6,882,971 B2* | 4/2005 | Craner ............... H04M 1/247 |
| | | 704/246 |
| 6,901,270 B1 | 5/2005 | Beach |
| 6,953,343 B2 | 10/2005 | Townshend |
| 6,961,561 B2 | 11/2005 | Himmel et al. |
| 6,988,070 B2 | 1/2006 | Kawasaki et al. |
| 7,006,793 B2 | 2/2006 | Himmel et al. |
| 7,016,709 B2 | 3/2006 | Kortum et al. |
| 7,026,957 B2 | 4/2006 | Rubenstein |
| 7,049,982 B2 | 5/2006 | Sleboda et al. |
| 7,054,659 B2 | 5/2006 | Gioscia et al. |
| 7,085,560 B2 | 8/2006 | Petermann |
| 7,091,851 B2 | 8/2006 | Mason et al. |
| 7,107,081 B1 | 9/2006 | Fujisaki |
| 7,123,906 B1 | 10/2006 | Otterbeck et al. |
| 7,164,904 B2 | 1/2007 | Nagy et al. |
| 7,203,721 B1 | 4/2007 | Ben-Efraim et al. |
| 7,233,661 B2 | 6/2007 | Palett et al. |
| 7,237,717 B1 | 7/2007 | Rao et al. |
| 7,317,705 B2 | 1/2008 | Hanson |
| 7,366,662 B2 | 4/2008 | Visser et al. |
| 7,394,405 B2 | 7/2008 | Godden |
| 7,467,186 B2 | 12/2008 | Attar et al. |
| 7,486,972 B2 | 2/2009 | Kouno |
| 7,487,084 B2 | 2/2009 | Aaron et al. |
| 7,489,946 B2 | 2/2009 | Srinivasan et al. |
| 7,502,627 B2 | 3/2009 | Sacks et al. |
| 7,505,643 B2 | 3/2009 | Lee et al. |
| 7,522,065 B2 | 4/2009 | Falcon |
| 7,526,279 B1 | 4/2009 | Fujisaki |
| 7,532,879 B1 | 5/2009 | Fujisaki |
| 7,548,617 B2 | 6/2009 | Yuen |
| 7,551,921 B2 | 6/2009 | Petermann |
| 7,567,904 B2 | 7/2009 | Layher |
| 7,627,470 B2 | 12/2009 | Manabe et al. |
| 7,657,255 B2 | 2/2010 | Abel et al. |
| 7,664,475 B2 | 2/2010 | Ichihara |
| 7,671,730 B2 | 3/2010 | Henderson |
| 7,684,791 B2 | 3/2010 | Plestid et al. |
| 7,689,253 B2 | 3/2010 | Basir |
| 7,697,024 B2 | 4/2010 | Currivan et al. |
| 7,734,280 B2* | 6/2010 | Eastlake, III ......... H04L 63/08 |
| | | 455/411 |
| 7,769,342 B2 | 8/2010 | Tabe |
| 7,778,664 B1 | 8/2010 | Fujisaki |
| 7,890,136 B1 | 2/2011 | Fujisaki |
| 7,904,219 B1 | 3/2011 | Lowrey et al. |
| 7,907,975 B2 | 3/2011 | Sakamoto et al. |
| 7,949,616 B2 | 5/2011 | Levy et al. |
| 7,953,447 B2 | 5/2011 | Shostak |
| 8,010,157 B1 | 8/2011 | Fujisaki |
| 8,014,722 B2 | 9/2011 | Abel et al. |
| 8,019,903 B2 | 9/2011 | Hanks et al. |
| RE42,831 E | 10/2011 | Yoon |
| 8,032,337 B2 | 10/2011 | Deichmann |
| 8,073,590 B1 | 12/2011 | Zilka |
| 8,108,217 B2 | 1/2012 | Yoo et al. |
| 8,112,037 B2 | 2/2012 | Ketari |
| 8,112,125 B2 | 2/2012 | Bailey, II |
| 8,121,649 B2 | 2/2012 | Shostak |
| 8,145,256 B2 | 3/2012 | Chen |
| 8,165,077 B2 | 4/2012 | Reddy |
| 8,175,639 B2 | 5/2012 | Amirmokri |
| 8,195,576 B1 | 6/2012 | Grigg et al. |
| 8,199,763 B2 | 6/2012 | Sheridan et al. |
| 8,244,307 B1 | 8/2012 | Tilgner et al. |
| 8,249,506 B2 | 8/2012 | Liu |
| 8,253,774 B2 | 8/2012 | Huitema et al. |
| 8,260,345 B2 | 9/2012 | Chmielewski et al. |
| 8,265,862 B1 | 9/2012 | Zilka |
| 8,271,005 B2 | 9/2012 | Carroll |
| 8,410,931 B2 | 4/2013 | Petite et al. |
| 8,416,132 B2 | 4/2013 | Kirmuss et al. |
| 8,428,648 B2 | 4/2013 | Gioscia et al. |
| 8,433,300 B1 | 4/2013 | Fujisaki |
| 8,438,023 B1 | 5/2013 | Hamilton et al. |
| 8,473,277 B2 | 6/2013 | Jephcott |
| 8,473,289 B2 | 6/2013 | Jitkoff et al. |
| 8,478,256 B1 | 7/2013 | Fujisaki |
| 8,494,132 B2 | 7/2013 | Stepanian |
| 8,503,996 B1 | 8/2013 | Fujisaki |
| 8,511,547 B2 | 8/2013 | Rans et al. |
| 8,515,505 B1 | 8/2013 | Pattikonda |
| 8,520,860 B2 | 8/2013 | Wulff et al. |
| 8,577,543 B2 | 11/2013 | Basir et al. |
| 8,581,954 B2 | 11/2013 | Lee et al. |
| 8,594,839 B2 | 11/2013 | Hanson |
| 8,601,096 B2 | 12/2013 | Balasuriya |
| 8,611,876 B2 | 12/2013 | Miller |
| 8,626,246 B2 | 1/2014 | Shostak |
| 8,627,839 B1 | 1/2014 | Martinez |
| 8,629,755 B2 | 1/2014 | Hashim-Waris |
| 9,042,525 B2* | 5/2015 | Harris ................ H04M 1/271 |
| | | 379/201.12 |
| 9,552,417 B2* | 1/2017 | Olligschlaeger .... H04M 3/2281 |
| 2009/0099850 A1* | 4/2009 | Do ....................... G06F 3/0425 |
| | | 704/276 |
| 2011/0066091 A1 | 3/2011 | Larson et al. |
| 2011/0166856 A1* | 7/2011 | Lindahl ................... G10L 15/20 |
| | | 704/233 |
| 2011/0295603 A1* | 12/2011 | Meisel .................... G10L 15/07 |
| | | 704/246 |
| 2011/0307256 A1* | 12/2011 | Schultz ................... H04M 3/385 |
| | | 704/246 |
| 2013/0083151 A1* | 4/2013 | Kim ........................ H04L 65/1069 |
| | | 348/14.07 |
| 2013/0097682 A1* | 4/2013 | Zeljkovic ............... H04L 9/3231 |
| | | 726/7 |
| 2013/0257753 A1* | 10/2013 | Sharma ................. G06F 3/0488 |
| | | 345/173 |
| 2014/0052480 A1* | 2/2014 | Bell ....................... G06Q 40/08 |
| | | 705/4 |
| 2014/0309996 A1* | 10/2014 | Zhang .................... G10L 21/16 |
| | | 704/246 |
| 2015/0058016 A1* | 2/2015 | Goldstein ............. G06F 17/30743 |
| | | 704/246 |
| 2015/0082404 A1* | 3/2015 | Goldstein .............. G10L 17/00 |
| | | 726/7 |

\* cited by examiner

MOBILE TERMINAL AND CONTROL METHOD THEREOF

CROSS-REFERENCE TO RELATED APPLICATION(S)

This application claims the benefit under 35 U.S.C. § 119(a) of a Korean patent application filed on May 23, 2014 in the Korean Intellectual Property Office and assigned Serial number 10-2014-0062018, the entire disclosure of which is hereby incorporated by reference.

TECHNICAL FIELD

The present disclosure relates to a mobile terminal and a control method. More particularly, the present disclosure relates to a mobile terminal capable of providing a dialogist with user information based on the voice of the user and a control method thereof.

BACKGROUND

With the rapid spread of mobile terminals, for example, smart phones, users of the mobile terminals may perform online activities through the mobile terminals in common spaces such as homes, businesses, or public places. Accordingly, it is possible to observe acquaintances through a social network service (SNS) in various types of texts, images, and moving pictures, and the users of the mobile terminals may freely provide their news through the SNS regardless of places.

The users of the mobile terminals may share a variety of news exchanged online, that is, the SNS with acquaintances at offline meetings, and upload various events having occurred offline to the SNS in real-time. Furthermore, it is also possible to receive the news of other users, which may not be known by the users of the mobile terminals, through the SNS. With a change in mobile environments in which the boundary between offline and online is not clear, users of the mobile terminals can more easily access "my peripheral environments" that are difficult to be known online. Therefore, recently, users of mobile terminals are very interested in "my peripheral environments" and desire to receive information on the "my peripheral environments" more quickly and easily.

The above information is presented as background information only to assist with an understanding of the present disclosure. No determination has been made, and no assertion is made, as to whether any of the above might be applicable as prior art with regard to the present disclosure.

SUMMARY

However, mobile terminals according to the related art do not sufficiently reflect the requirements of users. For example, users of mobile terminals may desire to inform a listener (a communication partner) of their information. In this case, the users may transfer their information to the listener through an offline medium such as a business card, or transfer their information through a mobile messenger, an electronic business card and the like. However, such an operation does not sufficiently satisfy the demands of users who desire to receive information on "my peripheral environments" more quickly and easily.

Aspects of the present disclosure are to address at least the above-mentioned problems and/or disadvantages and to provide at least the advantages described below. Accordingly, an aspect of the present disclosure is to provide a mobile terminal capable of easily providing a user of a mobile terminal with the identification information (for example, a phone number or an E-mail address) of a dialogist through the dialogist's voice that is unique identification information for the dialogist.

Another aspect of the present disclosure is to provide a method for controlling a mobile terminal capable of providing a user with identification information of a dialogist using the dialogist's voice, which is unique identification information for the dialogist.

Although technical merits of the present disclosure may be achieved by the mentioned aspect, other aspects of the present disclosure may be apparently understood by those skilled in the art through the following description.

In accordance with an aspect of the present disclosure, a mobile terminal is provided. The mobile terminal includes a voice receiving module configured to receive the voice of a user through a first application and to generate first voice data for the voice received through the first application, a control module configured to transmit the first voice data and user information corresponding to the first voice data to a service server and to request the service server to register the first voice data and the user information, and a communication module configured to transmit, to the service server, a request for the user information corresponding to the voice of the user received through a second application when the voice of the user is received through the second application.

In accordance with another aspect of the present disclosure, a method for controlling a mobile terminal is provided. The method includes receiving the voice of a user through a first application and generating first voice data for the voice received through the first application, transmitting the first voice data and user information corresponding to the first voice data to a service server and requesting the service server to register the first voice data and the user information, and transmitting, to the service server, a request for user information corresponding to the voice of the user received through a second application when the voice of the user is received through the second application.

According to the present disclosure as described above, identification information related to a dialogist may be received through only voice of the dialogist, so that it is possible to receive information on "my peripheral environments" more quickly and easily.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
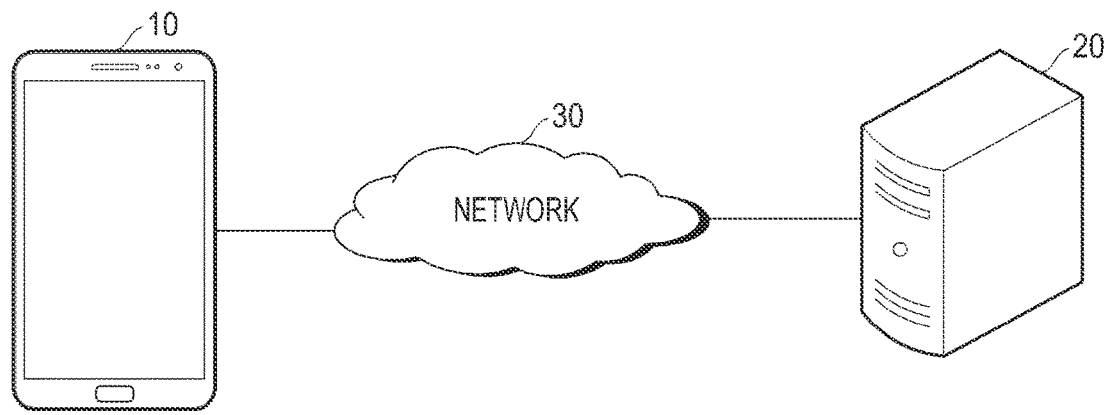
FIG. 1 schematically illustrates a system for providing dialogist information according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the elements. The expressions may be used to distinguish a component element from another component element. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or 'directly connected" to another component element, it may be construed that a third component element does not exist between the first component element and the second component element.

The terms used in various embodiments of the present disclosure are merely used to exemplify a certain embodiment and should not limit various embodiments of the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

FIG. 1 schematically illustrates a system for providing dialogist information according to an embodiment of the present disclosure.

Referring to FIG. 1, a dialogist information providing system according to an embodiment of the present disclosure may include a mobile terminal 10, a service server 20, and a network 30 that connects the mobile terminal 10 to the service server 20.

The mobile terminal 10 according to the embodiment of the present disclosure may include a device having a communication function. For example, the mobile terminal 10 may include at least one of a smart phone, a tablet personal computer (PC), a mobile phone, a video phone, an E-book reader, a desktop PC, a laptop PC, a netbook computer, a personal digital assistant (PDA), a portable multimedia player (PMP), an MP3 player, a mobile medical device, a camera, a wearable device (for example, a head-mounted device (HMD) such as electronic glasses), electronic clothes, an electronic bracelet, an electronic necklace, an electronic accessory, an electronic tattoo, and a smart watch. In the present disclosure, for the purpose of convenience, a description will be provided for the case in which the mobile terminal 10 according to the embodiment of the present disclosure is realized as a smart phone. A function/functions or an operation/operations, which are performed by the mobile terminal 10 according to the embodiment of the present disclosure, will be described later.

The service server 20 according to the embodiment of the present disclosure may be connected to the mobile terminal 10 through the network 30 and may transmit/receive various types of information/data. Similarly to the mobile terminal 10, a function/functions or an operation/operations, which are performed by the service server 20, will be described later.

The mobile terminal 10 and the service server 20 according to the embodiment of the present disclosure may be connected to the network 30 through wireless communication or wired communication. The wireless communication may include at least one of wireless fidelity (WiFi), Bluetooth (BT), near field communication (NFC), global positioning system (GPS), and cellular communication (for example, Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM) and the like). The wired communication, for example, may include at least one of universal serial bus (USB), high definition multimedia interface (HDMI), recommended standard 232 (RS-232), and plain old telephone service (POTS).

Figure 2:
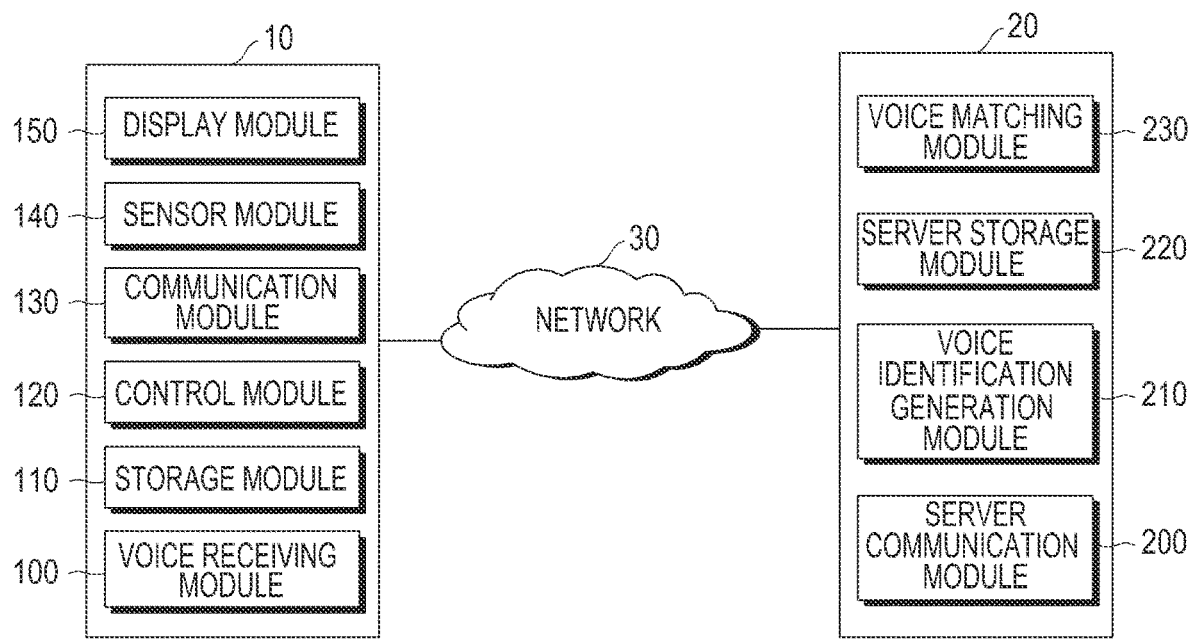
FIG. 2 illustrates a mobile terminal and a service server included in a system for providing dialogist information according to an embodiment of the present disclosure.

FIG. 2 illustrates the mobile terminal and the service server included in the system for providing dialogist information according to an embodiment of the present disclosure.

Referring to FIG. 2, the mobile terminal 10 according to the embodiment of the present disclosure may include a voice receiving module 100, a storage module 110, a control module 120, a communication module 130, a sensor module 140, and a display module 150.

The voice receiving module 100 may be configured to receive the voice of a user 40 of the mobile terminal 10 or the voice of a communication partner (i.e., a speaker or a dialogist), who speaks with the user 40 in an offline environment. In an implementation, the voice receiving module 100 may include associated hardware devices such as a microphone. The voice receiving module 100 may receive the voice or sound and generate an electrical signal (for example, first voice data according to the embodiment of the present disclosure) for the received voice. The voice receiving module 100 may generate the first voice data that is received through a first application (for example, an application for voice communication). Furthermore, the voice receiving module 100 may be set to generate second voice data of a dialogue partner that is received through a second application (for example, an application for acquiring the voice of the dialogue partner in order to receive information of the dialogue partner, or a voice recognition application, for example, "S voice"). The first voice data and the second voice data generated by the voice receiving module 100 may include analog voice data. The analog voice data may be converted into digital voice data by the control module 120. The first voice data or the second voice data that is transmitted to the service server 10 may include voice data converted into the digital voice data by the control module 120. The "first voice data" in the present specification may indicate voice data generated from the voice of the user 40 received through the first application. The "second voice data" in the present specification may indicate voice data generated from the voice of the dialogue partner 50 received through the second application.

The storage module 110 may store signals or data input/output in the mobile terminal 10. The storage module 110 may store control programs that control of the mobile terminal 10 or the control module 120 and various applications. The storage module 110 may include a storage device such as a Read-only memory (ROM) (not illustrated) and a Random-access memory (RAM) (not illustrated) included in the control module 120, or a memory card (not illustrated, for example, a Secure Digital (SD) card, a memory stick and the like) provided in the mobile terminal 10. The storage module 110 may include a nonvolatile memory, a volatile memory, a hard disk drive (HDD), or a solid state drive (SSD).

The control module 120 may include a Central Processing Unit (CPU), a ROM, which stores the control program for the control of the mobile terminal 10, and a RAM which stores signals or data that is input into the mobile terminal 10 or is used as a storage area for operations performed in the mobile terminal 10. The CPU may include any suitable number of processing cores. The CPU, the ROM, and the RAM may be connected to one another through an internal bus. The control module 120 may control the voice receiving module 100, the storage module 110, the communication module 130, the sensor module 140, and the display module 150.

The control module 120 may transmit the first voice data and user information (i.e., the information of the user 40) corresponding to the first voice data to the service server 20, and control the communication module 130 to transmit a request for registering the first voice data and the user information in the service server 20. In another embodiment of the present disclosure, the control module 120 load position data and time data at the time point at which the voice of the user 40 has been received through the first application. The position data and the time data may be detected by the sensor module 140. The sensor module 140 will be described later.

The control module 120 load information (for example, a phone number of the mobile terminal 10, an E-mail address stored in the mobile terminal 10, a social networking service (SNS) address of the user 40, an electronic business card of a user, and the like) of a user, which is stored in the storage module 110. The user information loaded by the control module 120 may be transmitted to the service server 20 together with the first voice data, and may be registered (stored) in the service server.

The communication module 130 may include a mobile communication module (not illustrated) and a sub-communication module (not illustrated). The mobile communication module may allow the mobile terminal 10 to connect to an external device through mobile communication by using at least one antenna (not illustrated). The mobile communication module may transmit/receive a wireless signal for voice communication, video communication, a short message service (SMS), or a multimedia message service (MMS) with a cellular phone, a smart phone, a tablet PC, or another device.

The sub-communication module may include at least one of a wireless Local Area Network (LAN) module and a short range communication module. The wireless LAN module may be connected to the Internet via a wireless access point (AP). The wireless LAN module may support the wireless LAN standard of Institute of Electrical and Electronics Engineers (IEEE) such as IEEE 802.11x. The short range communication module may perform wireless short range communication with an external device. The short range communication scheme may include Bluetooth, infrared data association (IrDA), WiFi-Direct communication, NFC, and the like.

The external device may include various devices such as an earphone, an external speaker, a USB memory, a charger, a cradle, a docking station, a Digital Multimedia Broadcasting (DMB) antenna, a mobile payment-related device, a healthcare device (a blood glucose meter and the like), a game machine, or a vehicle navigation system, which is detachable to the mobile terminal 10 and may be connected in a wired manner.

Furthermore, the external device may include a short range communication device such as a Bluetooth communication device or a NFC device which may be wirelessly connected to the mobile terminal 10 by short range communication, a WiFi Direct communication device, and an AP. Furthermore, the external device may include another device, a cellular phone, a smart phone, a tablet PC, a desk top PC, and a server.

The communication module 130 may transmit the first voice data, the second voice data, and various types of user information to the servicer server 20.

The sensor module 140 may include at least one sensor that detects the state of the mobile terminal 10. For example, the sensor module 140 may include a proximity sensor that detects whether a user is proximate to the mobile terminal 10 and an illumination sensor that detects the amount of light incident to the mobile terminal 10. Furthermore, the sensor module 140 may include a Gyro sensor that may detect an displacement of the mobile terminal 10 (for example, rotation of the mobile terminal 10 and acceleration or vibration applied to the mobile terminal 10), detect the direction of the compass by using the earth's magnetic field, and detect a direction in which gravity acts. Furthermore, the sensor module 140 may include an altimeter that measures atmospheric pressure and detects altitude. The at least one sensor may detect a state, generate a signal corresponding to the detection, and transmit the signal to the control module 120. The sensor module 140 may include a GPS module that detects the current position of the mobile terminal 10. Furthermore, the sensor module 140 may include a timer that detects the current time. According to various embodiments, the current time may also be configured to be detected by the control module 120. Supplement sensors of the sensor module 140 may be added or removed according to the performance of the mobile terminal 10, and added or removed according to various embodiments.

The mobile terminal 10 according to the embodiment of the present disclosure may include the display module 150. Although not illustrated in FIG. 2, the mobile terminal 10 may further include a display module controller that controls the display module 150. The display module 150 and the display module controller may be a touchscreen and a touchscreen controller. Hereinafter, for the purpose of convenience, a description of an example is provided in which the display module 150 and the display module controller are a touchscreen and a touchscreen controller, respectively.

The display module 150 may provide a user with user interfaces corresponding to various services (for example, communication, data transmission, broadcasting, and photographing). The display module 150 may transmit an analog signal corresponding to at a touch input to the user interface. The display module 150 may receive touch input from a person's body (for example, fingers including a thumb) or a touchable input device (for example, a stylus pen). Furthermore, the display module 150 may receive a continuous movement of one touch from the touch. The display module 150 may transmit an analog signal corresponding to a continuous movement of an input touch to the display module controller.

In the present disclosure, the touch is not limited to a touch between the display module 150 and the body of a user or the touchable input means, and may include a non-touch. An interval detectable in the display module 150 may be implemented according to the performance or structure of the mobile terminal 10.

The display module 150, for example, may be implemented to detect input with a resistive scheme, a capacitive scheme, an infrared scheme, or an acoustic wave.

The display module controller may convert the analog signal received from the display module 150 into a digital signal (for example, x and y coordinates), and transmit the digital signal to the control module 120. The control module 120 may control the display module 150 by using the received digital signal. For example, the control module 120 may allow a shortcut icon (not illustrated) displayed on the display module 150 to be selected or may execute the corresponding application (not illustrated) in response to a touch. Furthermore, the display module controller may also be included in the control module 120. The display module 150 display a response received from the service server 20 according to an information providing request for the dialogue partner 50.

The service server 20 according to the embodiment of the present disclosure may include a server communication module 200, a voice identification generation module 210, a server storage module 220, and a voice matching module 230.

The server communication module 200 may perform a function/functions or an operation/operations similar to those of the aforementioned communication module 130.

The server communication module 200 may include various communication modules that are connected to the mobile terminal 10 through the network 30 and transmit/receive information/data. The server communication module 200 may be set to receive various types of information/data such as the first voice data, the second voice data, the user information, the registration request, or the dialogist information request that are transmitted from the mobile terminal 10.

The voice identification generation module 210 may generate voice identification data based on the first voice data transmitted from the mobile terminal 10. The voice identification data of a person has a unique characteristic like a fingerprint of a person, and it is known that the accuracy of speaker identification is equal to or more than 99% (refer to L. G. Kersta, Nature 196, 1253, 1962). Accordingly, since the voice identification data of the user 40 is unique, the user 40 or the dialogist 50 may be identified based on the voice identification. The voice identification generation module 210 may generate the voice identification data based on the received first voice data of the user. In this case, the voice identification generation module 210 generates the voice identification data in the consideration of characteristics of the voice of the user 40, wherein the characteristics of the voice of the user 40 may include various factors such as the tone, the speed (the tempo), the volume, the intonation, the accent, the rhythm, ending processing and the like. The voice identification generation module 210 may store the user information transmitted from the mobile terminal 10 in the server storage module 220 with the generated voice identification data. The voice identification generation module 210 may repeatedly generate the voice identification data based on the received first voice data of the user 40.

The server storage module 220 may store the voice identification data generated by the voice identification generation module 210, various types of user information corresponding to the voice identification data, and the like. The server storage module 220 may include various storage media such as a nonvolatile memory, volatile memory, a HDD, or a SSD.

The voice matching module 230 may be set to compare the second voice data of the dialogue partner 50 transmitted from the mobile terminal 10 with the voice identification data stored in the server storage module 220. Such a comparison may be performed according to the information providing request for the dialogist 50 transmitted from the mobile terminal 10. The voice matching module 230 may compare the voice identification data stored in the server storage module 220 with the second voice data, and determine that the voice identification data matches with the second voice data when a matching rate is equal to or more than a predetermined rate (for example, 95%). The matching rate is for illustrative purposes only and is not limited thereto. In various embodiments, in order to limit a search range of the voice identification data, contact information (e.g., phone numbers) stored in the mobile terminal 10 may be transmitted to the service server 20 together with the information providing request for the dialogist 50. Accordingly, the voice matching module 230 may preferentially match voice identification data corresponding to the transmitted phone numbers. Since an operation/a function for arithmetically calculating the matching rate may use various related arts clearly understandable by those skilled in the art, a detailed description thereof will be omitted.

Hereinafter, various embodiments of the present disclosure will be described in detail with reference to FIG. 3 to FIG. 15.

Figure 3:
FIG. 3 is a view for describing an embodiment in which the voice of a user is received through a first application to register the voice in a service server according to an embodiment of the present disclosure.

FIG. 3 is a view for describing an embodiment in which the voice of a user is received through the first application to register the voice in the service server according to an embodiment of the present disclosure.

Referring to FIG. 3, the user 40 may make a call (voice or video communication) through the mobile terminal 10 at an arbitrary time. The first application may include an application for voice or video communication. When the user performs communication through the first application, the voice receiving module 100 may receive the voice of the user to learn the user's voice. That is, the voice receiving module 100 may learn the user's voice by repeatedly receiving the user's voice during a communication or until the user 40 satisfies a predetermined number of communication events (for example, 50 voice communications). That is, in order to ensure more accurate voice identification for the user 40, the voice receiving module 100 and the control module 120 may repeatedly receive or acquire the voice of the user 40. When the voice of the user 40 is received, the control module 120 may transmit the first voice data to the service server 20. In this case, as described above, the phone number of the mobile terminal 10, the E-mail address of the user, the SNS address and the like stored in the mobile terminal 10 may be loaded and transmitted together with the first voice data. Although FIG. 3 illustrates only one user 40, this is for illustrative purposes only and the description for FIG. 3 may be applied to a plurality of users in the same manner. Through such a process, voice data and information for the users 40 of a plurality of mobile terminals 10 may be stored in the service server 20.

According to another embodiment of the present disclosure, the control module 120 may load position data and/or time data at the time point at which the user voice has been received via the first application. The position data and the time data may be detected by the sensor module 140. The characteristic of the user voice, for example, the volume and the like of voice, may be changed according to the time of day. Furthermore, the characteristic of the voice of the user 40 may be changed according to the location where the user 40 currently makes a call (for example, at an office or at home). According to another embodiment of the present disclosure, as well as the voice of the user 40, data for a position and/or a time at which the user 40 has made a call may be transmitted to the service server 20, so that the voice identification generation module 210 may generate voice identification data based on the time and/or the position with reference to the time and/or the position of the call. According to various embodiments, in the case of generating voice identification data with reference to position data, the voice identification generation module 210 may generate voice identification data including a background noise in a peripheral environment. It is possible to more accurately determine a location where a dialogue with the dialogist 50 has occurred using the background noise. That is, the voice matching module 230 may compare the voice data of the dialogist 50 with the voice identification data stored in the service server 20 with reference to the aforementioned factors (the position data, the time data, or the background noise), thereby determining a matching rate in consideration of a change in the voice of the user 40 or the dialogist 50 that may be changed according to time and place, resulting in improved matching. Consequently, it is possible to more accurately provide information of the dialogist 50.

Figure 4:
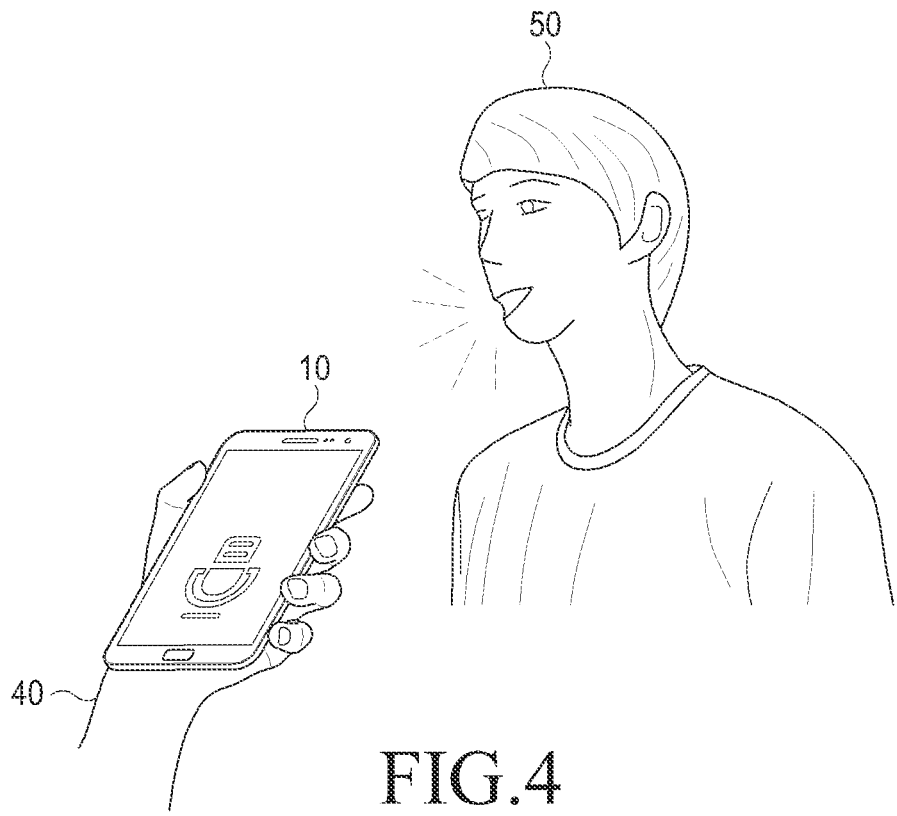
FIG. 4 is a view for describing an embodiment in which the voice of a dialogist is received through a second application to receive dialogist information according to an embodiment of the present disclosure.
Figure 5:
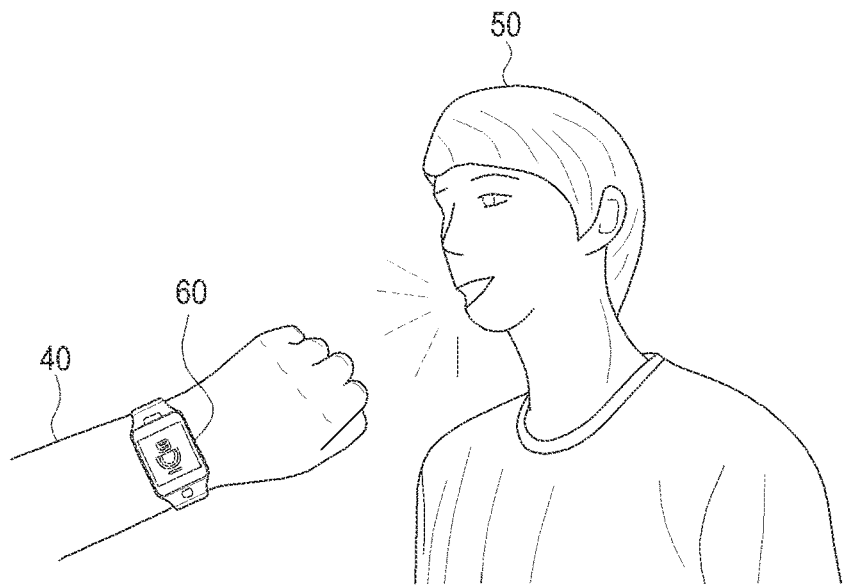
FIG. 5 is a view for describing another embodiment in which the voice of a dialogist is received through a second application to receive dialogist information according to an embodiment of the present disclosure.

FIG. 4 is a view for describing an embodiment in which the voice of a dialogist is received through the second application to receive dialogist information according to an embodiment of the present disclosure, and FIG. 5 is a view for describing another embodiment in which the voice of the dialogist is received through the second application to receive the dialogist information according to an embodiment of the present disclosure.

The user 40 of the mobile terminal may request information from the dialogue partner 50 during a conversation. During the conversation, the voice of the dialogue partner 50 may be received through the second application installed in the mobile terminal 10. When the voice of the dialogue partner 50 is received through the second application, the mobile terminal 10 may convert the voice of the dialogue partner 50 into second voice data. As described above, the second voice data transmitted to the service server 20 may include digital voice data. The control module 120 may control an information request message to be transmitted to the service server 20 together with the second voice data. According to various embodiments of the present disclosure, the control module 120 may control the information request message to be transmitted to the service server 20 only when there is a "transmission request" of the user 40. According to various embodiments of the present disclosure, the control module 120 may control the information request message to be transmitted to the service server 20 regardless of the "transmission request" of the user 40. The "transmission request" of the user, for example, may be input when a "transmission request" icon (not illustrated) displayed on the display module 150 is selected by the user 40.

Referring to FIG. 5, the voice of the dialogue partner 50 may be received through various electronic devices 60 connected to a mobile terminal through wired communication or wireless communication, in addition to the mobile terminal 10. FIG. 5 illustrates a smart watch (a wearable device) of various electronic devices in the embodiment, but the embodiment of the present disclosure is not limited thereto. The voice of the dialogue partner 50 may be recognized by the mobile terminal 10 through the wired communication or the wireless communication. A connection protocol of the mobile terminal 10 and the electronic devices 60 will be described later.

Figure 6:
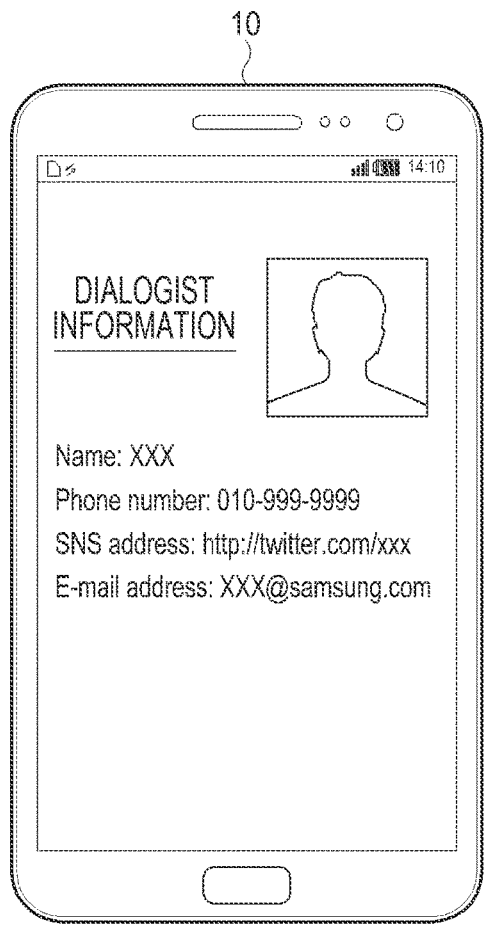
FIG. 6 is a view for describing an operation for displaying dialogist information according to an embodiment of the present disclosure.

FIG. 6 is a view for describing an operation for displaying dialogist information according to an embodiment of the present disclosure.

Referring to FIG. 6, the dialogist information (i.e., the information of the dialogist 50) may be displayed on the mobile terminal 10. The dialogist information, for example, may include a photo of the dialogist 50, a name of the dialogist 50, a phone number of the dialogist 50, an SNS address of the dialogist, an E-mail address of the dialogist, and the like, but this is for illustrative purposes only. The dialogist information may be displayed on the mobile terminal 10 in the form of an electronic business card. When the dialogist information is provided to the user 40 via a communication, this indicates that the dialogist 50 has registered their information in the service server 50.

Figure 7:
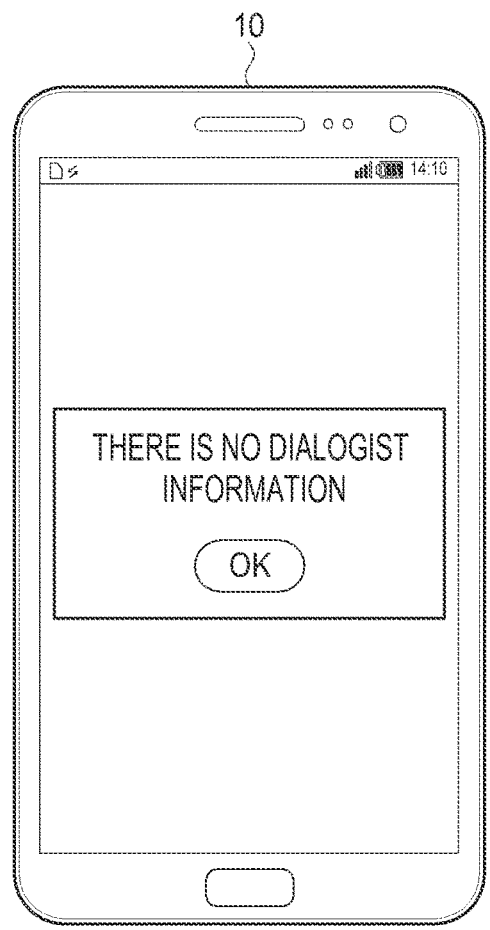
FIG. 7 is a view for describing an operation for displaying an indication that dialogist information does not exist in a service server according to an embodiment of the present disclosure.

FIG. 7 is a view for describing an operation for displaying an indication that dialogist information does not exist in the service server according to an embodiment of the present disclosure.

Referring to FIG. 7, the dialogist information may not be registered in the service server 20. In this case, the service server 20 may transmit a response indicating that the dialogist information has not been registered to the mobile terminal 10 as a response for the information request message. The mobile terminal 10 may display the content of the response received from the service server 20 through the display module 150 thereof.

Figure 8:
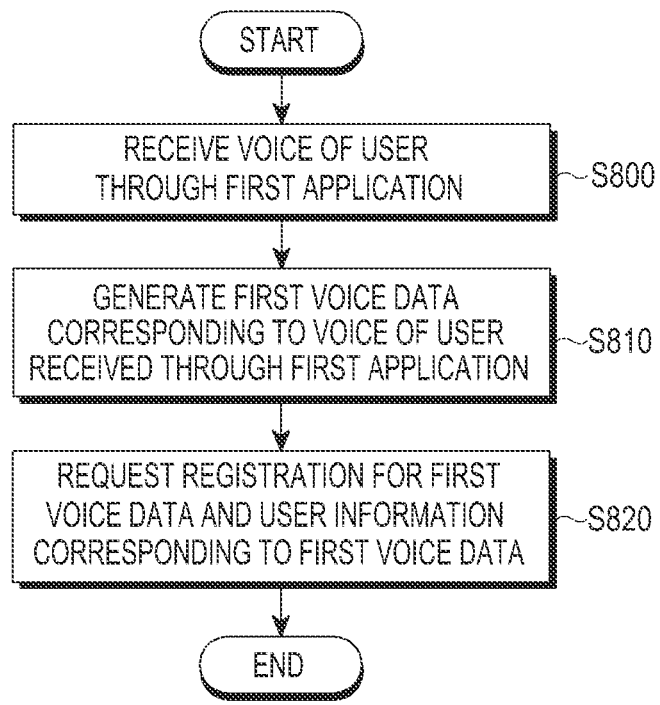
FIG. 8 is a flowchart for describing an embodiment in which a mobile terminal according to an embodiment of the present disclosure registers the voice of a user and user information when the voice of the user is received through a first application.

FIG. 8 is a flowchart for describing an embodiment in which the mobile terminal according to an embodiment of the present disclosure registers voice of a user and user information when the voice of the user is received through the first application.

Referring to FIG. 8, the mobile terminal 10 may receive the voice of the user 40 through the first application at operation S800. Next, at operation S810, the mobile terminal 10 may generate first voice data corresponding to the voice of the user that is received through the first application. The first voice data generated at operation S810 may include analog voice data. The mobile terminal 10 may request the service server 20 to register the first voice data and user information corresponding to the first voice data at operation S820. The registration request may include transmitting the first voice data and the user information to the service server 20. The first voice data transmitted to the service server 20 may include data converted into digital voice data. The user information may be loaded by the control module 120 and transmitted to the service server 20. The control module 120, for example, may load the user information with reference to a path that designates a specific folder where the user information is stored.

Figure 9:
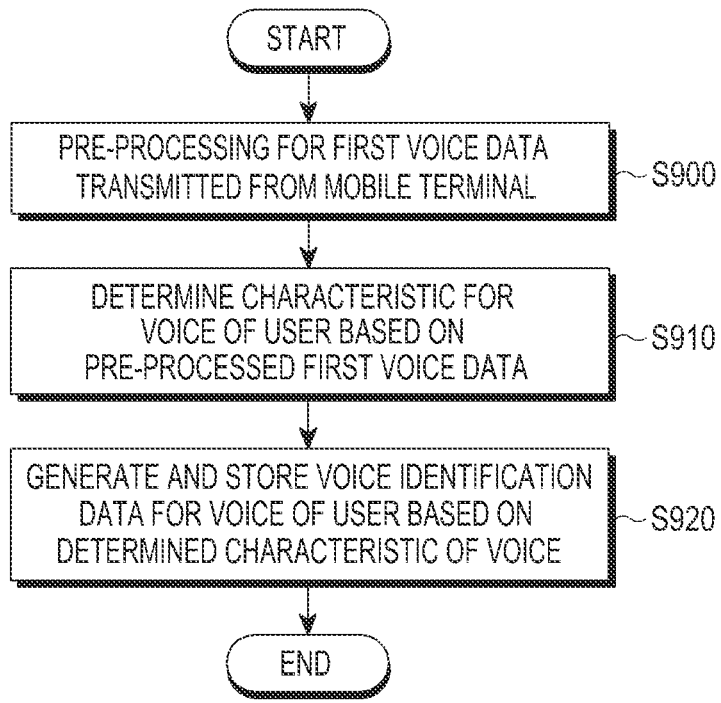
FIG. 9 is a flowchart for describing an embodiment in which a service server according to an embodiment of the present disclosure generates a voice identification of a user and registers the voice identification of the user in a service server together with information of the user.

FIG. 9 is a flowchart for describing an embodiment in which the service server according to an embodiment of the present disclosure generates a voice identification of a user and registers the voice identification of the user in the service server together with the user information.

Referring to FIG. 9, the service server 20 may perform pre-processing on the first voice data transmitted from the mobile terminal 10 at operation S900. The pre-processing may indicate an operation for analyzing the received voice data and filtering unnecessary noise. The service server 20 may determine a characteristic for the voice of the user 40 based on the pre-processed first voice data at operation S910 and generate and store voice identification data for the voice of the user 40 based on the analyzed characteristic of the voice at operation S920. Furthermore, the information (for example, the phone number and the like of the user 40) of the user 40 corresponding to the voice identification data may be stored in the form of a table together with the voice identification data.

Figure 10:
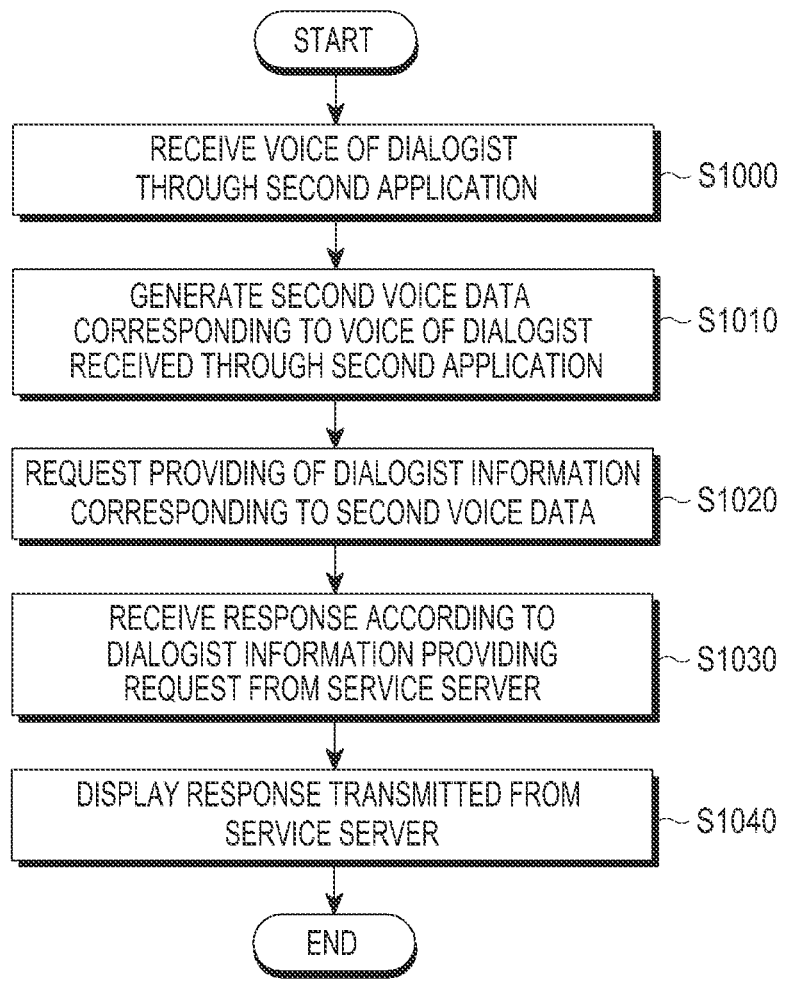
FIG. 10 is a flowchart for describing an embodiment in which a mobile terminal according to an embodiment of the present disclosure provides a user with dialogist information when the voice of the dialogist is received through a second application.

FIG. 10 is a flowchart for describing an embodiment in which the mobile terminal according to an embodiment of the present disclosure provides a user with dialogist information when the voice of the dialogist is received through the second application.

Referring to FIG. 10, the mobile terminal 10 may receive the voice of the dialogist through the second application at operation S1000 and generate second voice data from the received voice at operation S1010. The mobile terminal 10 may transmit a dialogist information request to the service server 20 at operation S1020 and receive a response according to the request from the service server 20 at operation S1030. The mobile terminal 10 may display the content of the response transmitted from the service server 20 at operation S1040.

Figure 11:
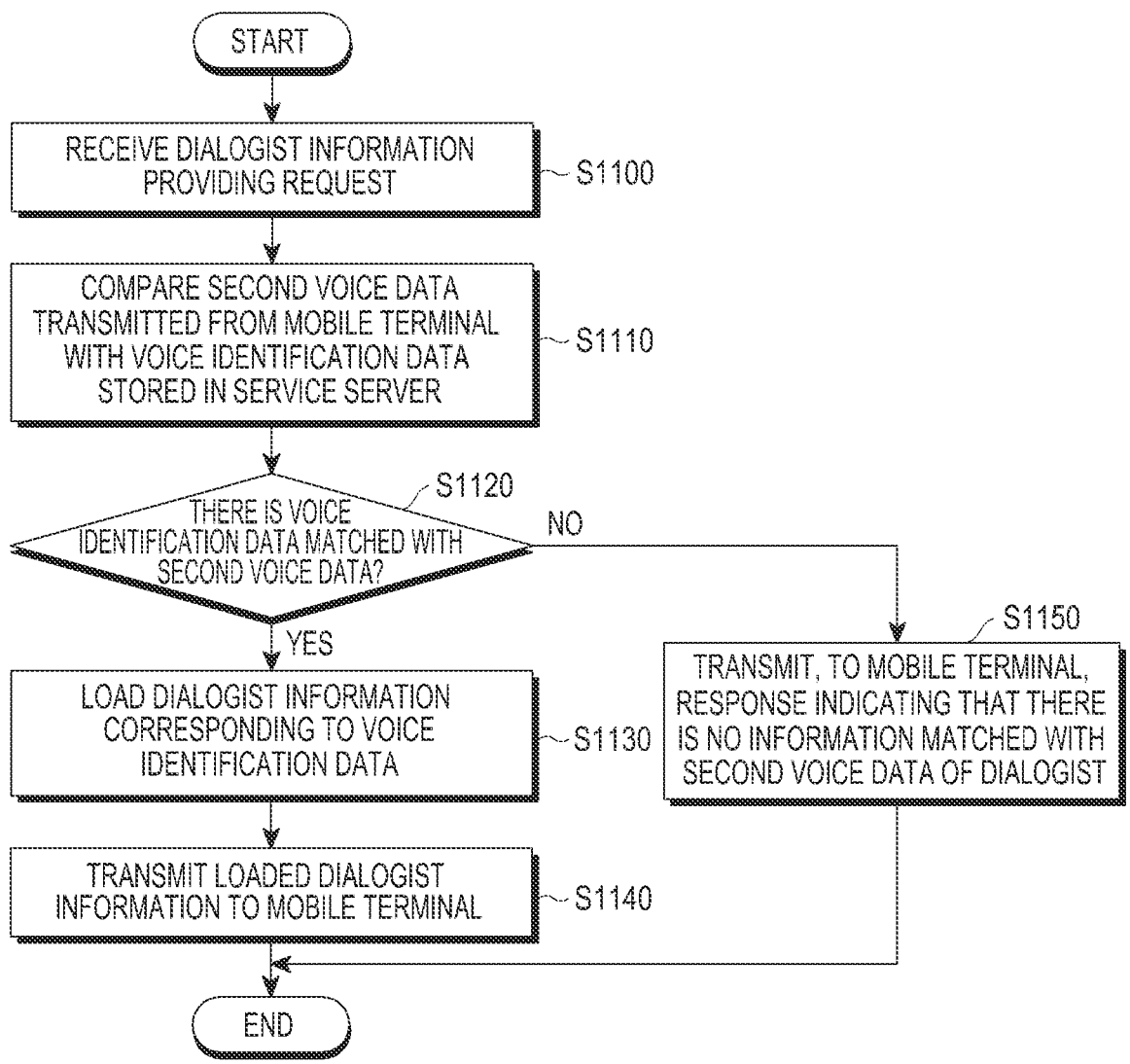
FIG. 11 is a flowchart for describing an embodiment in which a service server according to an embodiment of the present disclosure provides dialogist information according to a dialogist information request.

FIG. 11 is a flowchart for describing an embodiment in which the service server according to an embodiment of the present disclosure provides dialogist information according to a dialogist information request.

Referring to FIG. 11, the service server 20 may receive dialogist information request from the mobile terminal at operation S1100 and perform a comparison with the voice identification data stored in the service server 20 at operation S1110. The service server 20 may determine whether stored voice identification data matches with the second voice data (is stored in the service server 20) at operation S1120, load the dialogist information corresponding to the voice identification data at operation S1130, and transmit the dialogist information to the mobile terminal at operation S1140. When there is no voice identification data that matches with the second voice data, the service server 20 may transmit a response indicating that there is no dialogist information to the mobile terminal at operation S1150.

Figure 12:
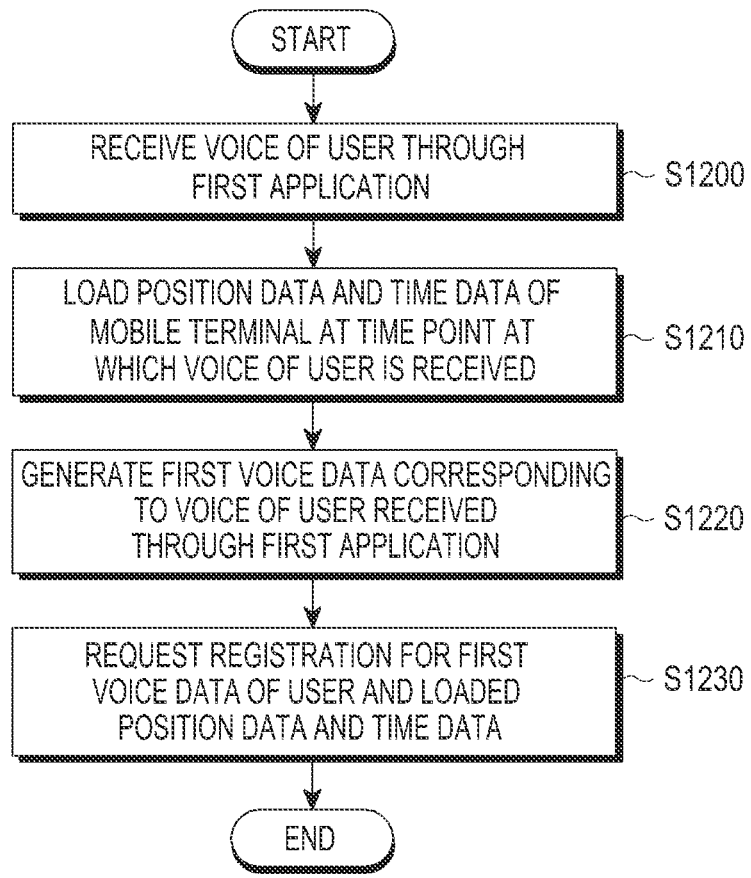
FIG. 12 is a flowchart for describing another embodiment in which a mobile terminal according to an embodiment of the present disclosure registers voice of a user and user information when the voice of the user is received through a first application.

FIG. 12 is a flowchart for describing another embodiment in which the mobile terminal according to an embodiment of the present disclosure registers the voice of a user and user information when the voice of the user is received through the first application.

Referring to FIG. 12, the mobile terminal 10 may receive the voice of the user 40 through the first application at operation S1200 and load position data and time data of the mobile terminal 10 at the time point at which the voice of the user 40 is received at operation S1210. This is for generating voice identification data with reference to a specific time and/or place with respect to the voice of the user 40 that may change as described above. Consequently, it is possible to improve the matching rate as compared with the case of monotonously generating voice identification data for the voice of the user without referring to the specific time or place. As a consequence, it is possible to provide the user 40 with more accurate dialogist information. The mobile terminal 10 may generate first voice data corresponding to the voice of the user 40 received through the first application at operation S1220 and transmit a registration request for the first voice data of the user 40 and the loaded position data and time data to the service server 20 at operation S1230. The registration request may include transmitting the first voice data of the user 40 and the loaded position data and time data to the service server 20.

Figure 13:
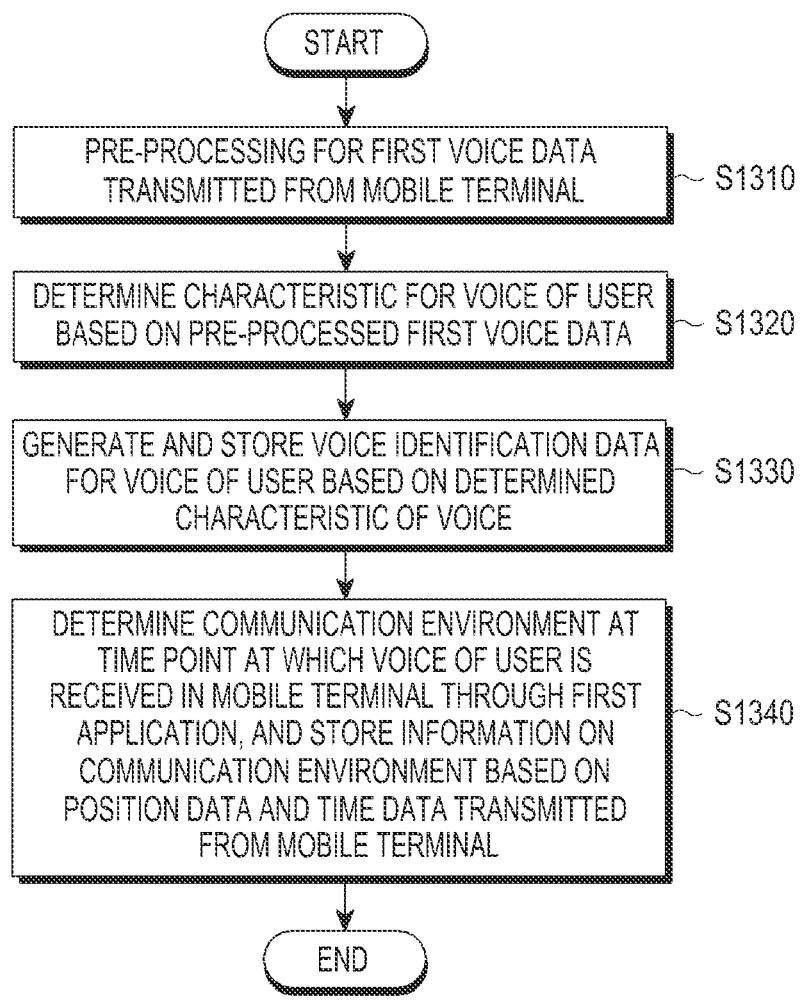
FIG. 13 is a flowchart for describing another embodiment in which a service server according to an embodiment of the present disclosure generates a voice identification of a user and registers the voice identification of the user in the service server together with user information according to a registration request received from a mobile terminal.

FIG. 13 is a flowchart for describing another embodiment in which the service server according to the embodiment of the present disclosure generates a voice identification of a user and registers the voice identification of the user in the service server together with user information according to a registration request received from the mobile terminal.

Referring to FIG. 13, the service server 20 may perform pre-processing for the first voice data transmitted from the mobile terminal 10 at operation S1310. The pre-processing may filter out other noises except for a background noise (for example, when the user 40 makes a call at an office, a sound and the like of a copy machine or a printer) due to environmental noises included in the first voice data. When the background noise where the user 40 is positioned is also stored as voice identification data and a dialogue with the dialogist 50 is conducted in the specific place, the background noise may also be compared, resulting in improvement of the matching rate. Next, the service server 20 may determine a characteristic for the voice of the user based on the pre-processed first voice data at operation S1320, and generate and store voice identification data for the voice of the user based on the determined characteristic of the voice at operation S1330. Based on the position data and/or the time data transmitted from the mobile terminal 10, the service server 20 may determine a communication environment at the time point at which the voice of the user 40 has been received and store the information on the communication environment at operation S1340.

Figure 14:
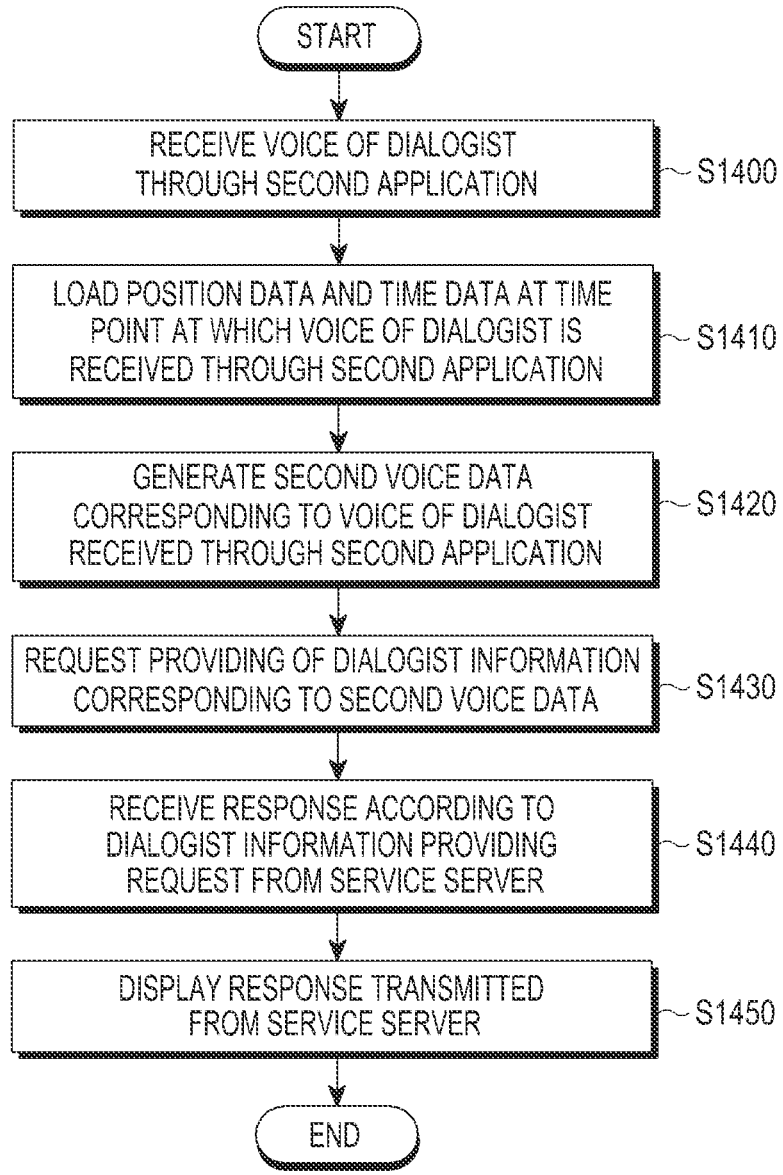
FIG. 14 is a flowchart for describing another embodiment in which a mobile terminal according to an embodiment of the present disclosure provides a user with dialogist information based on the voice of the dialogist when the voice of the dialogist is received through a second application.

FIG. 14 is a flowchart for describing another embodiment in which the mobile terminal according to the embodiment of the present disclosure provides a user with dialogist information based on the voice of the dialogist when the voice of the dialogist is received through the second application.

Referring to FIG. 14, the mobile terminal 10 may receive the voice of the dialogist 50 through the second application at operation S1400, and load position data and/or time data at the time point at which the voice of the dialogist 50 has been received at operation S1410. The mobile terminal 10 may generate second voice data corresponding to the voice of the dialogist 50 at operation S1420 and transmit dialogist information request based on the second voice data to the service server 20 at operation S1430. The mobile terminal 10 may receive a response according to the dialogist information request from the service server 20 at operation S1440 and display the response from the service server 20 at operation S1450.

Figure 15:
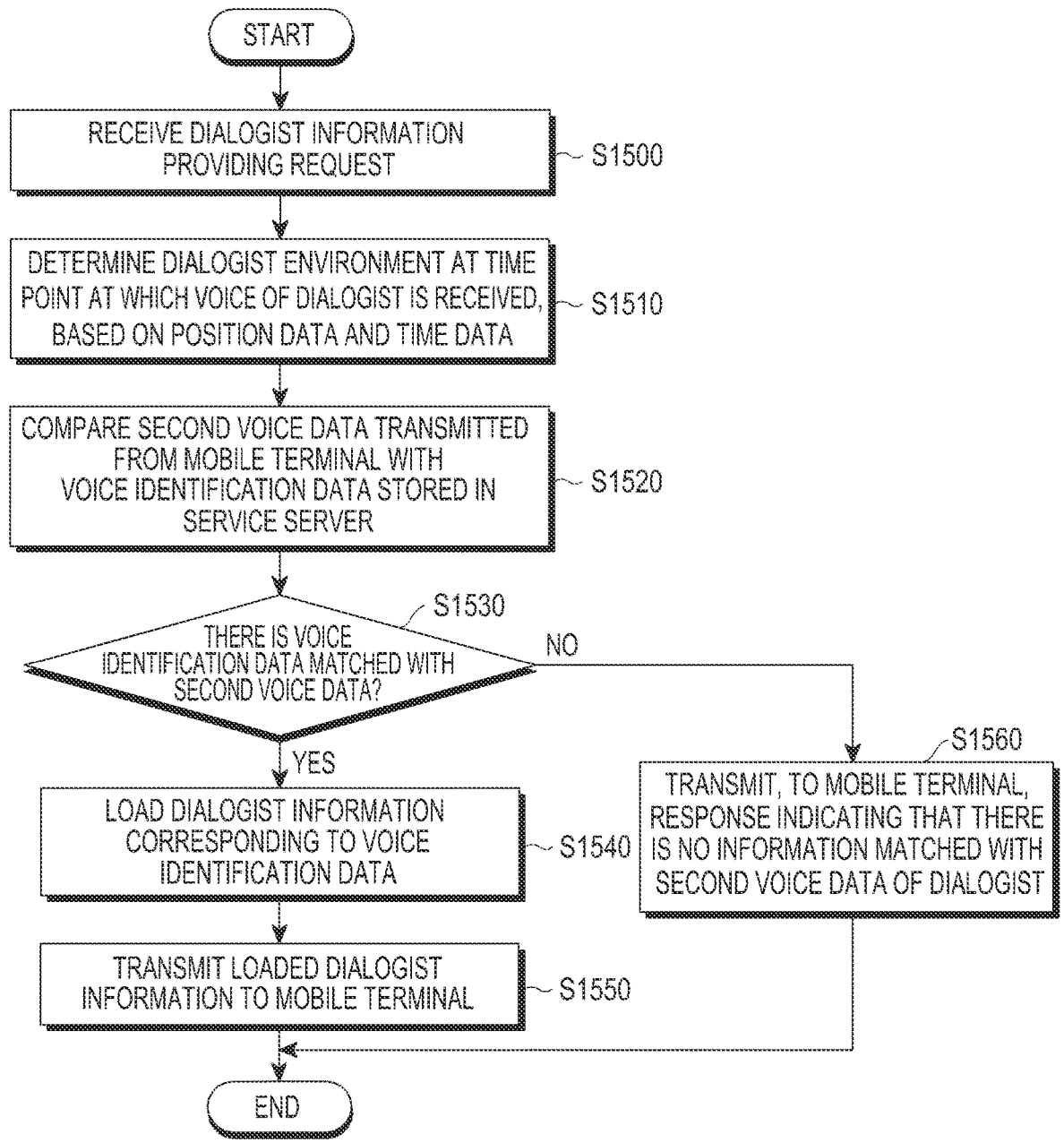
FIG. 15 is a flowchart for describing another embodiment in which a service server according to an embodiment of the present disclosure provides dialogist information.

FIG. 15 is a flowchart for describing another embodiment in which the service server according to the embodiment of the present disclosure provides dialogist information.

Referring to FIG. 15, the service server 20 may receive the dialogist information request from the mobile terminal 10 at operation S1500 and determine a dialogue environment at the time point, at which the voice of the dialogist 50 has been received, based on the transmitted position data and/or time data at operation S1510. In the determination of the dialogue environment, for example, it may be determined whether a dialogue with the dialogist 50 has been conducted in the early morning, or whether a dialogue with the dialogist 50 has been conducted at an office. The dialogue environment may be determined based on a dialogue time, a dialogue place, background noise included in the second voice data, and the like. The service server 20 may compare the second voice data transmitted from the mobile terminal 10 with the voice identification data stored in the service server 20 with reference to the determined dialogue environment at operation S1520, and determine if there is voice identification data that matches the second voice data at operation S1530.

When there is voice identification data with a rate equal to or more than the predetermined matching rate, the service server 20 may load the identified dialogist information at operation S1540, and transmit the identified dialogist information to the mobile terminal 10 at operation S1550. When there no print voice data with the rate equal to or more than the predetermined matching rate, the service server 20 may transmit a response indicating that there is no information that corresponds to the second voice data at operation S1560.

When determining the matching rate in consideration of the background noise, only data for the voice of the user 40, which is obtained by excluding the background noise from data for the voice of the dialogist 50 and the voice identification data, may be compared, and the matching rate may be determined. That is, since the background noise is referred to allow the place where the dialogue with the dialogist 50 has been conducted to be more apparent, the aforementioned background noise may not be referred when determining the matching rate.

In addition, since the descriptions for FIGS. 1 to 7 may be applied to the descriptions for FIGS. 8 to 15 in the same manner, detailed descriptions thereof will be omitted.

Figure 16:
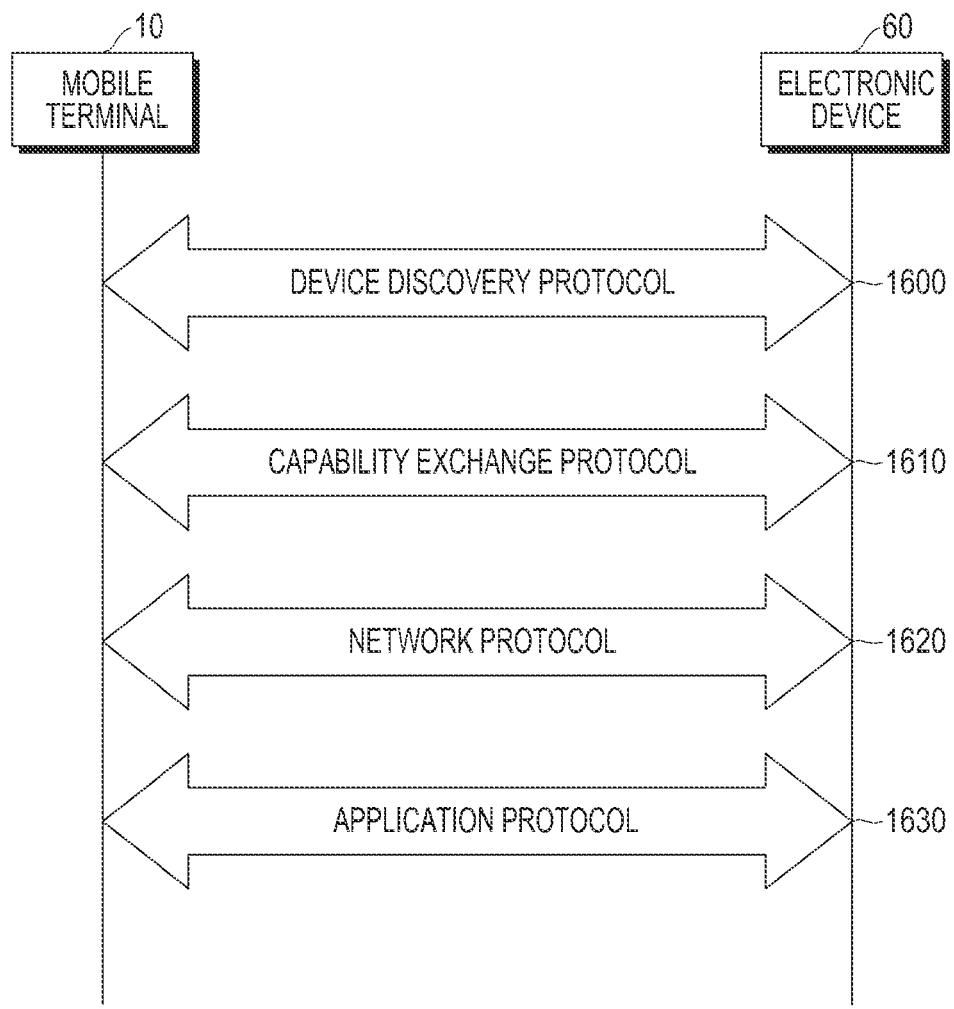
FIG. 16 is a view for describing a communication protocol between a mobile terminal according to an embodiment of the present disclosure and another electronic device.

FIG. 16 is a view for describing a communication protocol between the mobile terminal according to the embodiment of the present disclosure and another electronic device.

Referring to FIG. 16, for example, the communication protocol may include a device discovery protocol 1600, a capability exchange protocol 1610, a network protocol 1620, an application protocol 1630, and the like.

According to the embodiment of the present disclosure, the device discovery protocol 1600 may be used when a mobile terminal detects an external electronic device that may communicate with the mobile terminal, or is connected to the detected electronic device. For example, the mobile terminal 10 may detect the electronic device 60 may communicate with the mobile terminal 10 through a communication method (for example, WiFi, BT, USB and the like) using the device discovery protocol 1600. The mobile terminal 10 may acquire and store identification information of the detected electronic device 60 using the device discovery protocol 1600 for a communication connection with the electronic device 60. The mobile terminal 10, for example, may open a communication connection with the electronic device 60 based on at least the identification information.

According to the embodiment of the present disclosure, the device discovery protocol 1600 may be used for mutual authentication among a plurality of electronic devices. For example, the mobile terminal 10 perform authentication between the mobile terminal 10 and the electronic device 60 based on communication information (for example, media access control (MAC), universally unique identifier (UUID), service set identification (SSID), an internet protocol (IP)) for a connected with at least the electronic device 60.

According to the embodiment of the present disclosure, the capability exchange protocol 1610 may be used when at least one of the mobile terminal 10 and the electronic device 60 exchanges information related to capabilities of a supportable service. For example, the mobile terminal 10 and the electronic device 60 may exchange information related to capabilities of services, which are being currently provided, through the capability exchange protocol 1610. The exchangeable information may include identification information indicating a specific service among a plurality of services supportable by the mobile terminal 10 and the electronic device 60. For example, the mobile terminal 10 may receive identification information of a specific service provided by the electronic device 60 from the electronic device 60 through the capability exchange protocol 1610. In this case, based on the received identification information, it is possible to determine whether the mobile terminal 10 may support the specific service.

According to the embodiment of the present disclosure, the network protocol 1620 may be used to control the flow of data that is transmitted/received to provide, for example, an interworking service between electronic devices (for example, the mobile terminal 10 and the electronic device 60) connected to each other such that communication is possible. For example, at least one of the mobile terminal 10 and the electronic device 60 may perform error control, data quality control and the like by using the network protocol 1620. Additionally or alternatively, the network protocol 1620 may decide a transmission format of data that is transmitted/received between the mobile terminal 10 and the electronic device 60. Furthermore, at least one of the mobile terminal 10 and the electronic device 60 may manage (for example, a session connection or a session disconnection) at least a session for mutual data exchange by using the network protocol 1620.

According to the embodiment of the present disclosure, the application protocol 1630 may be used to provide a procedure or information for exchanging data related to a service provided to an external electronic device. For example, the mobile terminal 10 may provide a service to the electronic device 60 through the application protocol 1630.

According to the embodiment of the present disclosure, the communication protocol may include a standard communication protocol, a proprietary communication protocol (for example, a communication protocol designated by a communication device manufacturing company or a network supply company itself) designated by an individual or an organization, or a combination thereof.

The "module" used in various embodiments of the present disclosure may refer to, for example, a "unit" including one of hardware, software, and firmware, or a combination of hardware, software, and firmware. The "module" may be interchangeably used with a term, such as unit, logic, logical block, component, or circuit. The "module" may be a minimum unit of an integrally configured article or a part thereof. The "module" may be a minimum unit performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments of the present disclosure, at least part of a device (for example, modules or functions thereof) or a method (for example, operations) according to the various embodiments of the present disclosure may be embodied by, for example, an instruction stored in a non-transitory computer readable storage medium provided in a form of a programming module. When the command is executed by one or more processors, the one or more processors may perform a function corresponding to the command. The non-transitory computer-readable storage medium may be, for example, the memory. At least some of the programming modules may be implemented (for example, executed) by, for example, a processor. At least a part of the programming module may include, for example, a module, a program, a routine, a set of instructions and/or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a ROM, a RAM, a flash memory and the like. In addition, the program instructions may include high class language code, which can be executed in a computer by using an interpreter, as well as machine code made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner.

Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile terminal that provides information on a user based on a voice identification, the mobile terminal comprising:
    a microphone;
    a display;
    communication circuitry; and
    a processor configured to:
        control the microphone to receive a first voice of a first user through a first application, corresponding to a call application, for acquiring the first voice and generate a first voice data for the first voice received through the first application during a first time period,
        obtain a first position data and a first time data at a time point at which the first voice of the first user has been received through the first application,
        control the communication circuitry to transmit, the first voice data, first user information of the first user corresponding to the first voice data, the first position data and the first time data to a service server, and to request the service server to register the first voice data and the first user information,
        control the microphone to receive, in an offline environment, a voice data comprising a second voice data corresponding to a second user during a second time period through a second application different from the first application,
        obtain a second position data and a second time data at a time point at which the second voice of the second user has been received through the second application,
        control the communication circuitry to transmit, using the second application the second voice data, the second position data and the second time data to the service server for requesting second user information corresponding to the second user,
        control the communication circuitry to receive the second user information from the service server, when the second user information is pre-registered in the service server by another electronic device corresponding to the second user, wherein the second user information is identified based at least in part on the second voice data, the second position data and the second time data, and
        control the display to display the received second user information, wherein the second user is not a user of the mobile terminal.

2. The mobile terminal of claim 1, wherein the microphone obtains the second voice data for the voice of the second user received through mobile terminal.

3. The mobile terminal of claim 2, wherein the request for the second user information includes the generated second voice data.

4. The mobile terminal of claim 1, wherein the processor is further configured to control the communication circuitry to receive a response according to the request for the second user information from the service server when the second user information is not pre-registered in the service server.

5. The mobile terminal of claim 4, wherein the processor is further configured to control the display to display the response received from the service server.

6. The mobile terminal of claim 1, wherein, based on the transmitted first voice data, the service server generates voice identification data for the voice of the first user received through the call application.

7. The mobile terminal of claim 1, wherein, based on the first position data and the first time data, the service server identifies and stores a communication environment at the first time point at which the first voice of the first user has been received through the first application.

8. A method for controlling a mobile terminal that provides information on a user based on a voice identification, the method comprising:
    controlling a microphone to receive a first voice of a first user through a first application, corresponding to a call application, for acquiring the first voice and generating a first voice data for the first voice received through the first application during a first time period,
    obtaining a first position data and a first time data at a time point at which the first voice of the first user has been received through the first application,
    controlling a communication circuitry to transmit the first voice data, first user information of the first user corresponding to the first voice data, the first position data and the first time data to a service server and requesting the service server to register the first voice data and the first user information,
    controlling the microphone to receive, in an offline environment, a voice data comprising a second voice data corresponding to a second user through a second application different from the first application,
    obtaining a second position data and a second time data at a time point at which the second voice of the second user has been received through the second application,
    controlling the communication circuitry to transmit, using the second application, the second voice data, the second position data and the second time data to the service server for requesting second user information corresponding to the second user,
    controlling the communication circuitry to receive the second user information from the service server, when the second user information is pre-registered in the service server by another electronic device corresponding to the second user, wherein the second user information is identified based at least in part on the second voice data, the second position data and the second time data, and
    controlling a display to display the received second user information,
    wherein the second user is not a user of the mobile terminal.

9. The method of claim 8,
    wherein the second voice data based on the voice of the second user is received through the mobile terminal.

10. The method of claim 9, wherein the request for the second user information includes the generated second voice data.

11. The method of claim 8, further comprising:
    receiving a response according to the request for the second user information from the service server when the second user information is not pre-registered in the service server.

12. The method of claim 11, further comprising:
displaying the response received from the service server.

13. The method of claim 8, further comprising:
based on the transmitted first voice data, obtaining, by the service server, voice identification data for the voice of the user received through the call application.

14. The method of claim 8, further comprising:
based on the first position data and the first time data, identifying and storing, by the service server, a communication environment at the first time point at which the first voice of the first user has been received through the first application.

15. The mobile terminal of claim 1, further comprising:
identifying information of a dialogue environment between the first user and the second user based at least in part on a background noise in the second voice data.

16. The method of claim 8, further comprising:
identifying information of a dialogue environment between the first user and the second user based at least in part on a background noise in the second voice data.

* * * * *